(12) United States Patent
Gussen et al.

(10) Patent No.: US 10,255,472 B2
(45) Date of Patent: Apr. 9, 2019

(54) APPARATUS AND METHOD FOR TRANSMITTING TRAFFIC-RELATED DATA IN ROAD TRAFFIC

(71) Applicant: FORD GLOBAL TECHNOLOGIES, LLC, Dearborn, MI (US)

(72) Inventors: Uwe Gussen, Huertgenwald NRW (DE); Christoph Arndt, Moerlen Rheinland-Pfalz (DE); Frederic Stefan, Aachen NRW (DE); Frank Petri, Erfstad (DE)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 15/074,051

(22) Filed: Mar. 18, 2016

(65) Prior Publication Data
US 2016/0275329 A1    Sep. 22, 2016

(30) Foreign Application Priority Data
Mar. 20, 2015   (DE) .......................... 10 2015 205 050

(51) Int. Cl.
*G06K 7/10* (2006.01)
*G06K 7/14* (2006.01)
(Continued)

(52) U.S. Cl.
CPC ..... *G06K 7/1447* (2013.01); *G06K 19/06037* (2013.01); *G08G 1/0112* (2013.01); *G08G 1/09623* (2013.01); *G08G 1/096783* (2013.01)

(58) Field of Classification Search
CPC ....... G06K 19/06037; G06K 19/06112; G06K 7/1417; G06K 7/1447; G06F 17/30879;
(Continued)

(56) References Cited

U.S. PATENT DOCUMENTS

| 8,427,341 B2 | 4/2013 | Yulevich |
| 2013/0124186 A1* | 5/2013 | Donabedian .......... G06F 17/289 704/2 |

(Continued)

FOREIGN PATENT DOCUMENTS

| CN | 104167101 A | 11/2014 |
| DE | 102012223420 A1 | 6/2014 |

(Continued)

OTHER PUBLICATIONS

German Exam Report for German Application No. 10 2015 205 052.1 dated Dec. 17, 2015.
(Continued)

*Primary Examiner* — Thien M Le
(74) *Attorney, Agent, or Firm* — Frank Lollo; Brooks Kushman P.C.

(57) ABSTRACT

An apparatus and a method for transmitting traffic-related data in road traffic include transmitting the traffic-related data in the form of dynamically generated QR codes from a transmission or display device to a mobile unit hosted by at least one vehicle, and wherein the mobile unit hosted by the vehicle is designed likewise to transmit dynamically generated QR codes. The mobile unit may include an organic light emitting diode (OLED) display, or a smartphone, tablet, or similar device positioned for visibility through a vehicle window.

20 Claims, 2 Drawing Sheets

(51) Int. Cl.
*G08G 1/01* (2006.01)
*G08G 1/0962* (2006.01)
*G08G 1/0967* (2006.01)
*G06K 19/06* (2006.01)

(58) Field of Classification Search
CPC ...... G06F 17/2235; G06F 17/24; G06F 17/28;
G06F 17/289; G06F 17/30091; G06F
17/30887; B62D 15/028; B62D 15/0285
USPC .................................................. 235/462.11
See application file for complete search history.

(56) References Cited

U.S. PATENT DOCUMENTS

| | | | | |
|---|---|---|---|---|
| 2014/0074352 | A1* | 3/2014 | Tate, Jr. | B62D 15/028 |
| | | | | 701/36 |
| 2014/0225711 | A1* | 8/2014 | Warrier | G06F 21/305 |
| | | | | 340/5.51 |
| 2014/0344062 | A1 | 11/2014 | Lamont | |
| 2015/0041530 | A1* | 2/2015 | Burkhart | G06K 19/06037 |
| | | | | 235/375 |
| 2015/0120474 | A1* | 4/2015 | Webb | B67D 7/04 |
| | | | | 705/18 |
| 2016/0140429 | A1* | 5/2016 | Glosser | G06K 19/06075 |
| | | | | 702/185 |
| 2016/0196484 | A1* | 7/2016 | Ciavatta | G06F 17/30879 |
| | | | | 235/462.1 |
| 2016/0379491 | A1* | 12/2016 | Arndt | G08G 1/09 |
| | | | | 701/117 |

FOREIGN PATENT DOCUMENTS

| | | |
|---|---|---|
| DE | 102013200381 A1 | 7/2014 |
| DE | 102013214842 A1 | 2/2015 |
| JP | H106197246 | 7/1994 |
| JP | 2008241507 A | 10/2008 |
| WO | 2014103156 A1 | 7/2014 |

OTHER PUBLICATIONS

European Exam Report for European Application No. 16160803.9 dated Jun. 22, 2016.

* cited by examiner

APPARATUS AND METHOD FOR TRANSMITTING TRAFFIC-RELATED DATA IN ROAD TRAFFIC

CROSS-REFERENCE TO RELATED APPLICATIONS

This application claims foreign priority benefits under 35 U.S.C. § 119(a)-(d) to DE 10 2015 205 050.5 filed Mar. 20, 2015, which is hereby incorporated by reference in its entirety.

TECHNICAL FIELD

The disclosure relates to an apparatus and to a method for transmitting traffic-related data in road traffic that may include dynamically generated QR codes for transmitting data in situations in which the standard data transmission channels are overloaded or are not working properly.

BACKGROUND

A problem that sometimes arises in data transmission, in particular in motor traffic, is that the conventional standard mobile communications network (GSM) is overloaded and/or is not working properly. In addition, other conventional information channels can also be subject to problems. For example, radio reception may be intermittent or traffic data is not transmitted with the degree of accuracy or "fine detail" that is necessary for communicating information correctly and, if necessary, for issuing warning signals promptly.

Furthermore, latency periods or time delays in receiving and routing the traffic-related data may also make it more difficult to transfer data correctly and promptly.

A device and a method used to provide advance road information to the driver of a vehicle may encode the information. The vehicle concerned may be equipped with at least one sensor for capturing or reading the information and with a device coupled to the sensor for processing the relevant information and for providing this information to the driver such as disclosed inter alia in U.S. Pat. No. 8,427,341 B2, for example.

A reader that can be mounted in the region of the rear-view mirror of a vehicle for the purpose of reading encoded information displayed on a road information sign, which information may contain, for example, an icy road-surface warning based on a temperature measurement is disclosed inter alia in JPH06197246, for example.

SUMMARY

Various embodiments according to the present disclosure provide an apparatus and a method for transmitting traffic-related data in road traffic that allow more reliable communication of information and, if necessary, prompt communication of warning signals.

In an apparatus according to one embodiment for transmitting traffic-related data in road traffic, the traffic-related data can be transmitted in the form of dynamically generated QR codes from a transmission or display device to a respective mobile unit hosted by at least one vehicle. The mobile unit may likewise transmit dynamically generated QR codes.

Within the meaning of the present application, "dynamic generation" of a QR code is understood to mean generating a QR pattern on the basis of a latest announcement or piece of information, where such dynamic QR codes are fundamentally different from conventional QR codes which can be read by an app or a smartphone.

In addition, within the meaning of the present application, the "transmission" of dynamically generated QR codes is understood to include also visual transmission by displaying the QR codes on a display surface or the like.

The present disclosure first contains in particular the concept of using dynamic QR codes to lessen or remove the problems described above. Thus according to the disclosure, QR symbols or QR codes, which are generated dynamically, are emitted to a vehicle. In particular in this case, the dynamically generated QR codes can be displayed on overhead traffic signs, digital traffic signs or the like for recognition by a vehicle.

The information transmission according to the invention using dynamically generated QR codes is implemented here in the form of bidirectional communication or bidirectional data transfer, where the relevant communication of information or data transmission can take place both from the traffic infrastructure device (e.g. an overhead traffic sign) to the vehicle and in the opposite direction (i.e. from the vehicle to the traffic infrastructure device). In addition, in various embodiments, bidirectional communication can also take place between the vehicle concerned and at least one further vehicle, which is accordingly equipped both for capturing or reading and for transmitting or displaying dynamically generated QR codes. As a result, it is possible to guarantee correct communication of information and, if necessary, prompt communication of warning signals even when the mobile communications network is experiencing problems or overload.

The information transmitted in the context of the embodiments of this disclosure may include traffic information such as information about traffic conditions, construction or road work, traffic diversions, storm warnings, or general information or requests. The data transmission of such dynamic QR codes may be performed by overhead traffic signs, digital traffic signs or even as a printed sign in an area of road work.

According to one embodiment, the transmission or display device is arranged on a traffic infrastructure device, in particular on a digital traffic sign, an overhead traffic sign, or the like.

According to one embodiment, the apparatus is designed for the bidirectional transfer of traffic-related data between the transmission or display device and the mobile unit hosted by the vehicle.

According to one embodiment, the mobile unit hosted by the vehicle comprises a camera for optical capture of the QR codes. Modern vehicles are often provided, for example, with a front camera for traffic sign recognition, road scanning etc., and therefore in particular such a ready-fitted front camera can be used to read the dynamically generated QR codes containing the associated information. If the vehicle concerned is not equipped with a front camera, the dynamic QR code can also be recognized or read using, for instance, a smartphone mounted on the windshield.

The relevant information can be displayed directly in the vehicle or output by an automatic spoken voice.

According to one embodiment, the mobile unit hosted by the vehicle comprises a mobile communications device, in particular a smartphone or a tablet computer.

According to one embodiment, the mobile unit hosted by the vehicle comprises at least one display for the visual display of the generated QR codes. In particular, the data transmission coming from the vehicle can be implemented, for example, using organic light emitting diodes (OLEDs) on the windshield or rear window of the vehicle concerned.

In other embodiments, cloud-based data transmission and corresponding memory clusters for the dynamically generated QR codes can also be used in order to improve the options and capacities for communicating warning signals and for data transfer.

Hence, according to one embodiment, the apparatus also comprises a virtual memory (cloud) for storing data related to the QR codes.

Embodiments of the disclosure also include a method for transmitting traffic-related data in road traffic, in which method the traffic-related data is transmitted in the form of dynamically generated QR codes from a transmission or display device to a respective mobile unit hosted by at least one vehicle, which mobile unit hosted by the vehicle likewise transmits dynamically generated QR codes.

According to one embodiment, the dynamically generated QR codes are transmitted from the mobile unit hosted by the vehicle back to a traffic infrastructure device comprising the transmission or display device.

According to one embodiment, the dynamically generated QR codes are transmitted from the mobile unit hosted by the vehicle to another vehicle, which is equipped with a capture device for reading the QR codes.

The claimed subject matter is described in greater detail below with reference to a representative embodiment presented in the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
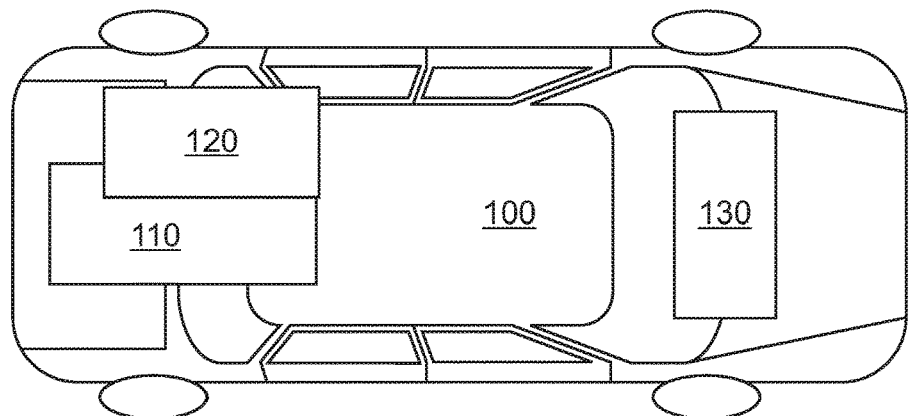
FIG. 1 is a schematic diagram of a representative embodiment illustrating components of a vehicle equipped with QR code features.

As shown in FIG. 1, a vehicle 100 equipped according to one embodiment comprises a front camera 110 and a display 120, which in the embodiment illustrated is implemented as an organic light emitting diode (OLED) and is designed to display QR codes. A further display (likewise in the form of an OLED display and also for the purpose of displaying QR codes) is denoted by 130.

Figure 2:
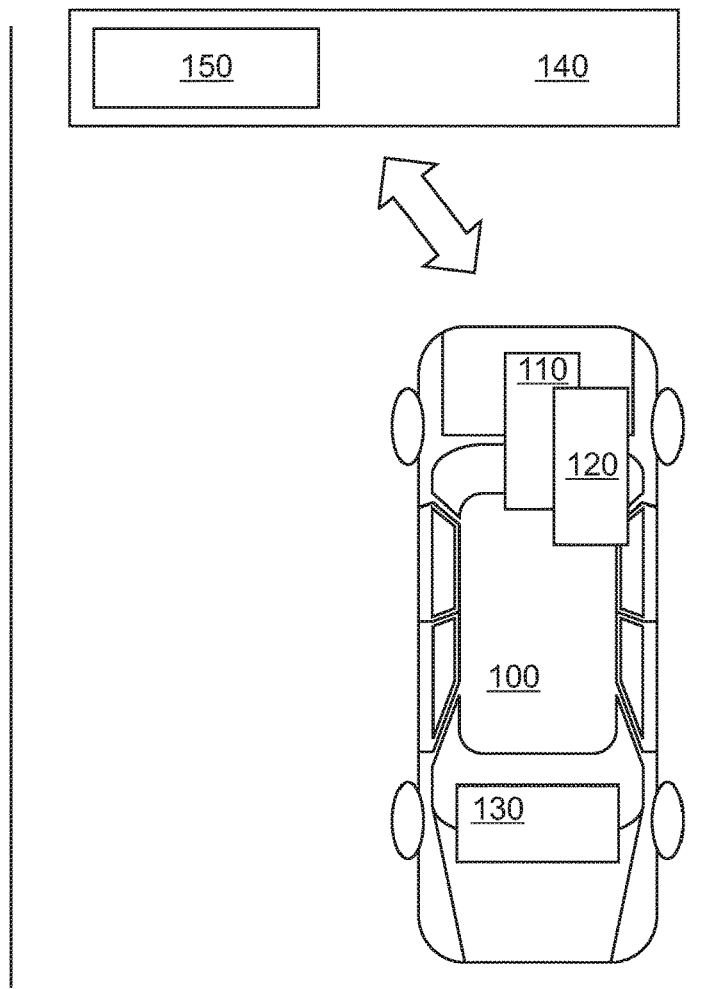
FIG. 2 is a schematic diagram illustrating the bidirectional communication taking place between an existing traffic infrastructure device in the form of an overhead traffic sign and a vehicle equipped with QR code features.

FIG. 2 shows purely schematically how the vehicle 100 passes an existing traffic infrastructure device 140 in the form of an overhead traffic sign, which traffic infrastructure device 140 likewise comprises a display 150 which allows the display of QR codes.

The QR codes displayed in the context of the disclosure are generated dynamically on the basis of a latest announcement or piece of information and, in the scenario shown in FIG. 2, can be transmitted both from the traffic infrastructure device 140, or more specifically from the display 150 present there, to the vehicle 100 (where the QR codes are captured and read using the front camera 110 or even using a smartphone, for instance mounted on the windshield) and in the opposite direction from the vehicle 100 to the traffic infrastructure device 140, where in the latter case, the QR codes to be transmitted are displayed on the display 120 by the vehicle 100 for transmission to, or capture by, the display 150 of the traffic infrastructure device 140.

In general, the data flow from the particular vehicle 100 to the traffic infrastructure device 140 can take place via a display (e.g. OLED display), which is fixed to the windshield or a side window of the vehicle 100 for instance. Such a system can then be used for data transmission from the vehicle environment or from a mobile device belonging to the driver to the traffic infrastructure device. In addition, when information is being communicated from the vehicle 100 to the traffic infrastructure device 140, the dynamically generated QR codes can be transmitted also using a mobile communications device such as a smartphone or tablet computer for instance.

In other embodiments, the bidirectional transmission of dynamically generated QR codes, as was described above with reference to FIGS. 1 and 2 between a vehicle and an existing traffic infrastructure device, can also take place between two vehicles, in which case each of the two vehicles is then equipped with a camera or reader for capturing the transmitted QR codes and with a display or other suitable device (such as a cell phone or tablet computer) for displaying or transmitting the various QR codes. It is thereby possible to communicate traffic information correctly and promptly, and, if necessary, to provide additional support for issuing appropriate warning signals.

In other embodiments, a virtual memory in the form of a cloud can also be used as a memory cluster for information associated with communicating information according to the invention by means of dynamically generated QR codes.

Figure 3:
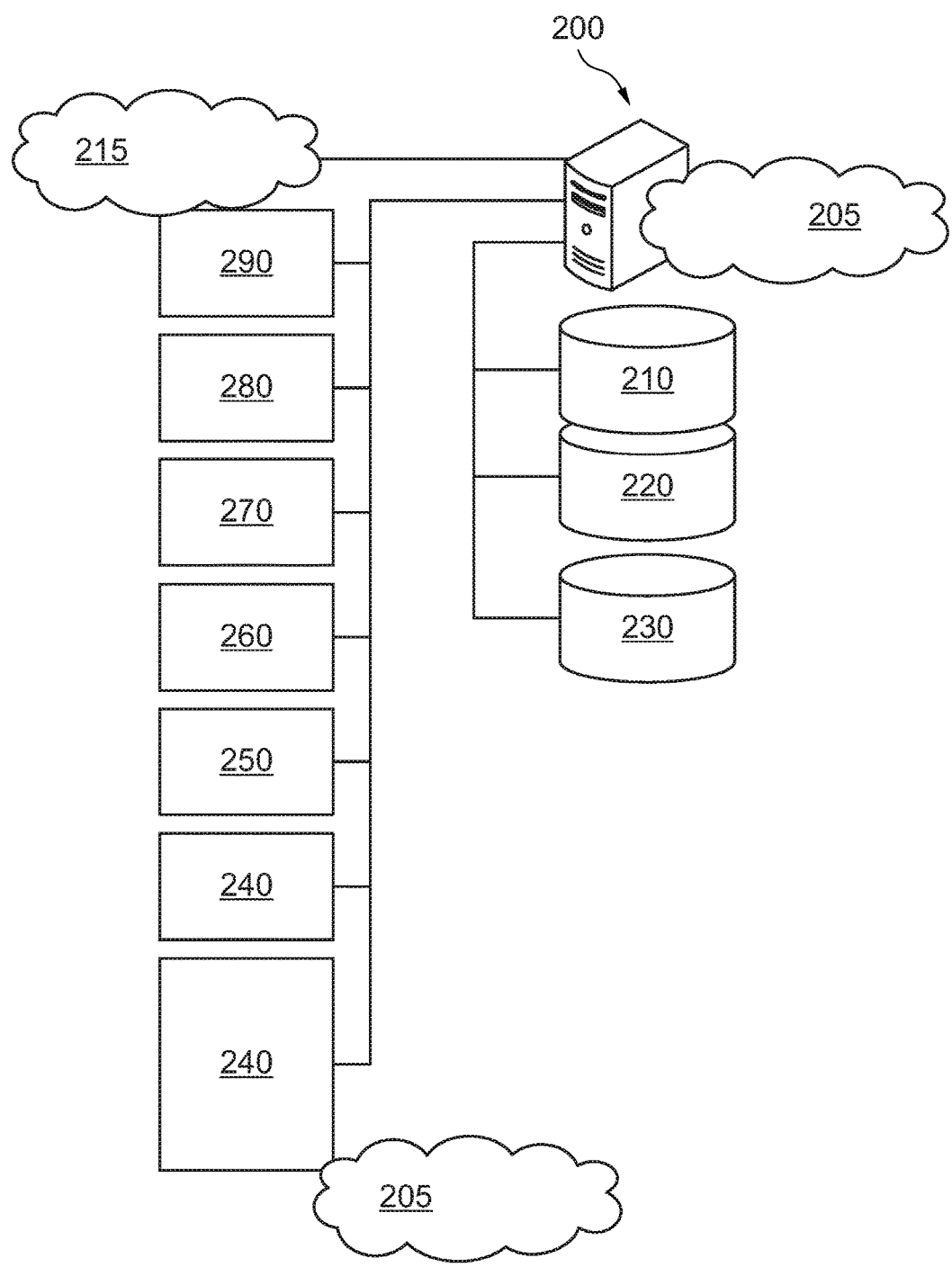
FIG. 3 is a block diagram of an embodiment illustrating components present in an apparatus having QR code functionality.

FIG. 3 shows purely schematically a virtual memory of this type, denoted by 215, where suitable cloud support 205 is provided on the part of the vehicle 100. In the illustrated embodiment, the stored databases include a database 210 for the QR codes to be transmitted, a database 220 for HMI support, and a database 230 for the bidirectional communication. As shown in FIG. 3, further components comprised by the vehicle 100 are a display data interface 240 for using the display as a transmission device for the dynamically generated QR codes, a smartphone data interface 250 for using a smartphone as a transmission device for the dynamically generated QR codes, a unit 260 for data-integration of the input data from a smartphone, a unit 270 for data-integration of the input data from the front camera, a unit 280 for data-integration of vehicle input data, and a "broadcasting agent" 290. The input data itself (e.g. information about traffic obstructions, road work, traffic diversions, storm warnings, or general information or requests) is denoted by 240.

While various representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A system for communicating traffic-related data, comprising:
    a mobile device disposed within or on a vehicle and configured to receive a dynamically generated QR code representing traffic-related data, and to transmit dynamically generated QR codes representing traffic-related data.

2. The system of claim 1 further comprising a display device arranged on a traffic infrastructure device configured to dynamically generate a QR code representing traffic-related data.

3. The system of claim 1 wherein the mobile device comprises a smartphone.

4. The system of claim 1, the mobile device comprising a camera mounted to the vehicle for optical capture of the QR codes.

5. The system of claim 1 wherein the mobile device comprises a tablet computer.

6. The system of claim 1 wherein the mobile device comprises at least one display mounted within the vehicle configured for visual display of the dynamically generated QR codes.

7. The system of claim 1 further comprising a second mobile device disposed within or on a second vehicle and configured to receive a dynamically generated QR code from the mobile device.

8. The system of claim 1 wherein the mobile device comprises an organic light emitting diode (OLED) display.

9. A method for communicating traffic-related data to a vehicle, comprising:
    receiving QR codes dynamically generated and varying in response to the traffic-related data from a display by a camera of a vehicle; and
    transmitting dynamically-generated QR codes from a vehicle display, the dynamically-generated QR codes varying in response to the traffic-related data.

10. The method of claim 9 wherein transmitting comprises transmitting the dynamically-generated QR codes from the vehicle display to a traffic infrastructure device.

11. The method of claim 9 wherein receiving comprises receiving the dynamically-generated QR codes by a smartphone within the vehicle.

12. The method of claim 9 wherein transmitting comprises transmitting the dynamically-generated QR codes by an OLED display mounted in the vehicle.

13. The method of claim 9 wherein transmitting comprises transmitting the dynamically-generated QR codes to another vehicle.

14. The method of claim 9 wherein receiving comprises receiving dynamically-generated QR codes transmitted by a display of a second vehicle.

15. The method of claim 9 wherein receiving comprises receiving dynamically-generated QR codes transmitted by a traffic infrastructure device.

16. A vehicle system comprising:
    a camera;
    a display; and
    a processor coupled to the camera and the display and configured to receive dynamically generated QR codes that do not include an encoded URL from the camera representing traffic data and to dynamically generate QR codes that do not include an encoded URL representing traffic data to the display, wherein the dynamically generated QR codes comprise patterns that change in response to the traffic data.

17. The vehicle system of claim 16 wherein the camera is mounted on a front of a vehicle.

18. The vehicle system of claim 16 wherein the camera receives dynamically generated QR codes from a traffic infrastructure device.

19. The vehicle system of claim 16 wherein the display is mounted in a vehicle.

20. The vehicle system of claim 16 wherein the camera and the display comprise a smartphone wirelessly linked to a vehicle.

* * * * *